United States Patent

Murata et al.

[11] Patent Number: 5,928,297
[45] Date of Patent: Jul. 27, 1999

[54] SUSPENSION CONTROL DEVICE OF VEHICLE ACCORDING TO GENETIC ALGORITHM

[75] Inventors: Masahiro Murata, Gotebma; Tomomi Nakayama, Mishima; Toshiyuki Kobayashi, Susono; Yasuhiko Mishio, Gotemba; Mitsuhiko Morita, Susono; Tomoko Tashiro, Shizuoka-ken, all of Japan

[73] Assignee: Toyota Jidosha Kabushiki Kaisha, Toyota, Japan

[21] Appl. No.: 08/792,802

[22] Filed: Feb. 3, 1997

[30] Foreign Application Priority Data

Feb. 14, 1996 [JP] Japan ................... 8-050930

[51] Int. Cl.$^6$ ........................ B60G 17/015
[52] U.S. Cl. ............... 701/37; 701/8; 280/5.512; 280/5.515
[58] Field of Search ............ 701/37, 38; 280/5.504, 280/5.507, 5.512, 5.515, 5.519

[56] References Cited

U.S. PATENT DOCUMENTS

| | | | |
|---|---|---|---|
| 5,248,015 | 9/1993 | Fukushima et al. | 280/5.515 |
| 5,295,705 | 3/1994 | Butsuen et al. | 280/5.515 |
| 5,324,069 | 6/1994 | Ogawa | 701/37 |
| 5,361,209 | 11/1994 | Tsutsumi | 701/37 |
| 5,398,184 | 3/1995 | Yamaoka et al. | 280/5.507 |
| 5,438,514 | 8/1995 | Kakizaki et al. | 280/5.507 |
| 5,446,663 | 8/1995 | Sasaki et al. | 701/37 |
| 5,490,068 | 2/1996 | Shimizu et al. | 701/38 |
| 5,533,597 | 7/1996 | Nezu et al. | 280/5.515 |
| 5,701,246 | 12/1997 | Uchiyama | 701/37 |

FOREIGN PATENT DOCUMENTS

A-566091 10/1993 European Pat. Off. .
A-5-294122 11/1993 Japan .

*Primary Examiner*—Gary Chin
*Attorney, Agent, or Firm*—Oliff & Berridge, PLC

[57] ABSTRACT

A suspension control device for a vehicle equipped with suspension dampers variable of damping coefficient, including: a means for storing a group of schedules each having a plurality of information units for controlling the variation of the damping coefficient of the damper; a means for generating a new schedule by hybridizing more than one of the schedules selected from the group according to a predetermined genetic algorithm including mutation based upon a fictionalization that the schedules are living individuals each having the plurality of information units as a set of genes; a means for evaluating each of the schedules under current operation environment of the vehicle to determine the ranking of the schedules in the group in improving a predetermined performance of the suspension; a means for adopting a highest ranked schedule for controlling the damping coefficient of the damper; a means for deleting a lowest ranked schedule to keep the number of the schedules forming the group substantially constant; and a means for generating a control signal for controlling the damper based upon the highest ranked schedule.

18 Claims, 14 Drawing Sheets

FIG. 10

GROUP A

| | | | | | |
|---|---|---|---|---|---|
| Ia(1): | Cas(1) | Ra1(1) | Ra2(1) ------ | Ran(1) | Xa(1) |
| Ia(2): | Cas(2) | Ra1(2) | Ra2(2) ------ | Ran(2) | Xa(2) |
| ⋮ | ⋮ | ⋮ | ⋮ | ⋮ | ⋮ |
| Ia(m): | Cas(m) | Ra1(m) | Ra2(m) ------ | Ran(m) | Xa(m) |

GROUP B

| | | | | | |
|---|---|---|---|---|---|
| Ib(1): | Cbs(1) | Rb1(1) | Rb2(1) ------ | Rbn(1) | Xb(1) |
| Ib(2): | Cbs(2) | Rb1(2) | Rb2(2) ------ | Rbn(2) | Xb(2) |
| ⋮ | ⋮ | ⋮ | ⋮ | ⋮ | ⋮ |
| Ib(m): | Cbs(m) | Rb1(m) | Rb2(m) ------ | Rbn(m) | Xb(m) |

GROUP C

| | | | | | |
|---|---|---|---|---|---|
| Ic(1): | Ccs(1) | Rc1(1) | Rc2(1) ------ | Rcn(1) | Xb(1) |
| Ic(2): | Ccs(2) | Rc1(2) | Rc2(2) ------ | Rcn(2) | Xb(2) |
| ⋮ | ⋮ | ⋮ | ⋮ | ⋮ | ⋮ |
| Ic(m): | Ccs(m) | Rc1(m) | Rc2(m) ------ | Rcn(m) | Xb(m) |

| I(1): | Cl(1) | Cm(1) | Ch(1) | X(1) |
| I(2): | Cl(2) | Cm(2) | Ch(2) | X(2) |
| ⋮ | | | | |
| I(m): | Cl(m) | Cm(m) | Ch(m) | X(m) |

| I(1): | Ckl(1) | Ckm(1) | Ckh(1) | Ds(1) | X(1) |
| I(2): | Ckl(2) | Ckm(2) | Ckh(2) | Ds(2) | X(2) |
| ⋮ | | | | | |
| I(m): | Ckl(m) | Ckm(m) | Ckh(m) | Ds(m) | X(m) |

SUSPENSION CONTROL DEVICE OF VEHICLE ACCORDING TO GENETIC ALGORITHM

BACKGROUND OF THE INVENTION

1. Field of the Invention

The present invention relates to the suspension of a vehicle such as an automobile, and more particularly, to a control of the damping performance of the vehicle suspension.

2. Description of the Prior Art

The suspension of a vehicle such as an automobile generally comprises a parallel combination of a spring and a damper to support a vehicle body on a vehicle wheel. In such a suspension mechanism, the term "shock absorber" is more generally used instead of the "damper". However, since the damper herein described operates as more than a mere shock absorbing means, the device is herein particularly called "damper". As well known in the art, when the damping coefficient of the suspension damper is low, vertical oscillation of the vehicle wheel is generally well damped or absorbed by the damper not to be transmitted to the vehicle body, but the suspension lacks in the firmness, and the stability of the vehicle is lost, particularly when the vehicle is subjected to a low frequency vertical force from the road surface.

In order to more widely adapt the suspension damper to various vertical oscillations of the vehicle wheel due to variations of road surface and driving speed, variable dampers have been developed in various principles and designs such that the damping coefficient is varied according to a control signal.

When the suspension damper is available as such a variable damper, the performance of the vehicle suspension can be more effectively improved by controlling the suspension according to the sky hook theory which itself is already well known in the art. An art of further improving the suspension performance of the vehicle based upon the sky hook theory is described in U.S. Pat. No. 5,324,069 or corresponding European Patent Laid-open Publication 0566091A1 assigned to the same assignee as the present application. According to the sky hook theory, the actual damper mounted between the vehicle wheel and the vehicle body in parallel with a suspension spring can perform as if it were mounted between the vehicle body and a stationary overhead support, if the damping coefficient C of the actual damper is controlled to be a product of the damping coefficient Cs of such a fictitious damper and a ratio of absolute vertical velocity Vb of the vehicle body to relative vertical velocity Vs of the vehicle body against the vehicle wheel, i.e. stroking velocity of the damper, as follows:

$$C = Cs \times Vb/Vs$$

Therefore, if the damping coefficient of the actual damper is variably controllable according to the ratio Vb/Vs (provided that Cs remains constant), the damping performance of the suspension will be much improved such that the vehicle body is damped against its vertical oscillation directly from a stationary overhead support via a damper as not affected by vertical movement of the vehicle wheel.

However, with respect to the adaptation of the damper of the vehicle suspension, there are still other factors. Although the damping performance of the suspension damper is initially adjusted based upon an estimation of certain operating conditions of the vehicle, the actual operating conditions are not always as estimated. Further, although the damping performance of each damper is nominally of a predetermined design, there is an unavoidable difference in the actual damping performance thereof according to a manufacturing allowance, and still further, the damping performance is affected by aging thereof.

Still further, more essentially, the damping performance of the vehicle suspension is affected by the load of the vehicle, i.e. the mass of the driver and the passenger or passengers, when there is or are. The damping force of the vehicle suspension damper acts against the dynamic force of the vehicle body which varies according to the total mass of the vehicle body including its load.

Therefore, it is desirable that the damping performance of the vehicle suspension damper is automatically adjusted time to time according to the operating conditions of the vehicle, or operation environment in more general concept.

On the other hand, if the fictious sky hook damper does not merely remain as an invariable damper while the damping coefficient C of the actual damper is varied according to Vb/Vs but if the damping coefficient Cs of the sky hook damper is also varied to compensate for the mass change of the vehicle body and other casual changes of external and internal operation environment of the vehicle, further improvements of the vehicle suspension performance will be expected.

SUMMARY OF THE INVENTION

In consideration of the above-mentioned possibility of further improvements of the vehicle suspension performance, it is a principal object of the present invention to provide a control device of a suspension of a vehicle such as an automobile in which the damping coefficient of the damper is automatically variably controlled according to the actual operation environment of the vehicle so as to be adapted to time to time changes thereof.

In order to accomplish the above-mentioned principal object, the present invention proposes a suspension control device for a suspension of a vehicle such as an automobile having a vehicle body and vehicle wheels each supporting the vehicle body at a corresponding portion thereof via the suspension, said suspension comprising a parallel combination of a spring and a damper having a means for varying damping coefficient thereof according to a control signal supplied thereto, said suspension control device comprising:

a means for storing a group of schedules each having a plurality of information units for controlling the variation of the damping coefficient of said damper;

a means for generating a new schedule by hybridizing more than one of said schedules selected from said group according to a predetermined genetic algorithm including mutation based upon a fictionalization that said schedules are living individuals each having said plurality of information units as a set of genes;

a means for evaluating each of said schedules under current operation environment of the vehicle to determine the ranking thereof in said group in improving a predetermined performance of the suspension;

a means for adopting a highest ranked schedule for controlling the damping coefficient of said damper;

a means for deleting a lowest ranked schedule to keep the number of said schedules forming said group substantially constant; and a means for generating said control signal based upon said highest ranked schedule.

In the suspension according to the present invention, said damper may be controlled according to the sky hook theory, and said information units may comprise value of the damping coefficient of the sky hook damper defined by the sky hook theory.

In this case, said new schedule generating means may comprise a means for restricting the value of the damping coefficient of said sky hook damper of a newly generated schedule between an upper limit and a lower limit.

Further, when the suspension control device according to the present invention is controlled according to the sky hook theory, said information units may comprise values of factors each dependent on ratio of vertical velocity of the vehicle body to vertical stroking velocity of said damper to be multiplied by the damping coefficient of the sky hook damper defined by the sky hook theory for determining the damping coefficient of said damper.

In this case, said factors may be modified such that each is a product of the vertical stroking velocity of said damper and a function of said vertical stroking velocity, the value of said function generally increasing along with increase of said vertical stroking velocity with a saturation.

Further, said schedule group storing means may be adapted to store a plurality of such groups, said suspension further comprising a means for selecting one of said plurality of groups as an object for said selection of the highest ranked schedule by said means for adopting the highest ranked schedule for controlling the damping coefficient of said damper.

In this case, said means for selecting one of said plurality of groups as an object for the selection of the highest ranked schedule by said highest ranked schedule adopting means may comprise a means for detecting density of frequency components of vertical acceleration of the vehicle body according to a plurality of frequency bands, and a means for detecting one of said plurality of groups which is largest in said density so that the selection among said groups is so made as to select one having the largest density.

Sill further, said information units may comprise value of a factor for modifying rate of at least one of heaving, pitching and rolling of the vehicle body for reflecting heaving, pitching and rolling of the vehicle body on the control of the damping coefficient of said damper.

Still further, said information units may comprise value of the damping coefficient of said damper to be targeted according to vertical acceleration of the vehicle body.

Still further, said information units may comprise an allowable largest value of the damping coefficient of said damper targeted according to engine rotation speed and changing rate thereof.

In this case, said schedule storing means may classify said allowable largest value dependent on engine rotation speed according to ranges of vehicle speed.

Further, said information units may comprise value of the damping coefficient of said damper to be targeted according to braking applied to the vehicle.

In this case, said schedule storing means may classify said target value dependent on braking according to ranges of vehicle speed.

In this case, further, said information units may comprise an allowable largest value of an abrupt change of braking.

In this case, further, said schedule storing means may classify said allowable largest value dependent on an abrupt change of braking according to ranges of vehicle speed.

Further, said information units may comprise value of the damping coefficient of said suspension to be targeted according to an allowable largest axial force acting through said damper.

Still further, said information units may comprise value of the damping coefficient of said suspension to be targeted according to an allowable largest changing rate of axial force acting through said damper.

Said new schedule generating means, said schedule evaluating means, said highest ranked schedule adopting means, and said lowest ranked schedule deleting means may be operated intermittently throughout an operation period of said suspension so as to occupy a substantially small portion of said operation period.

BRIEF DESCRIPTION OF THE DRAWINGS

In the accompanying drawings,

FIG. 10 shows an example of a plurality of groups of schedules handled by the suspension control device according to the present invention;

DESCRIPTION OF THE PREFERRED EMBODIMENTS

In the following, the present invention will be described in more detail with respect to some preferred embodiments with reference to the accompanying drawings.

Figure 1:
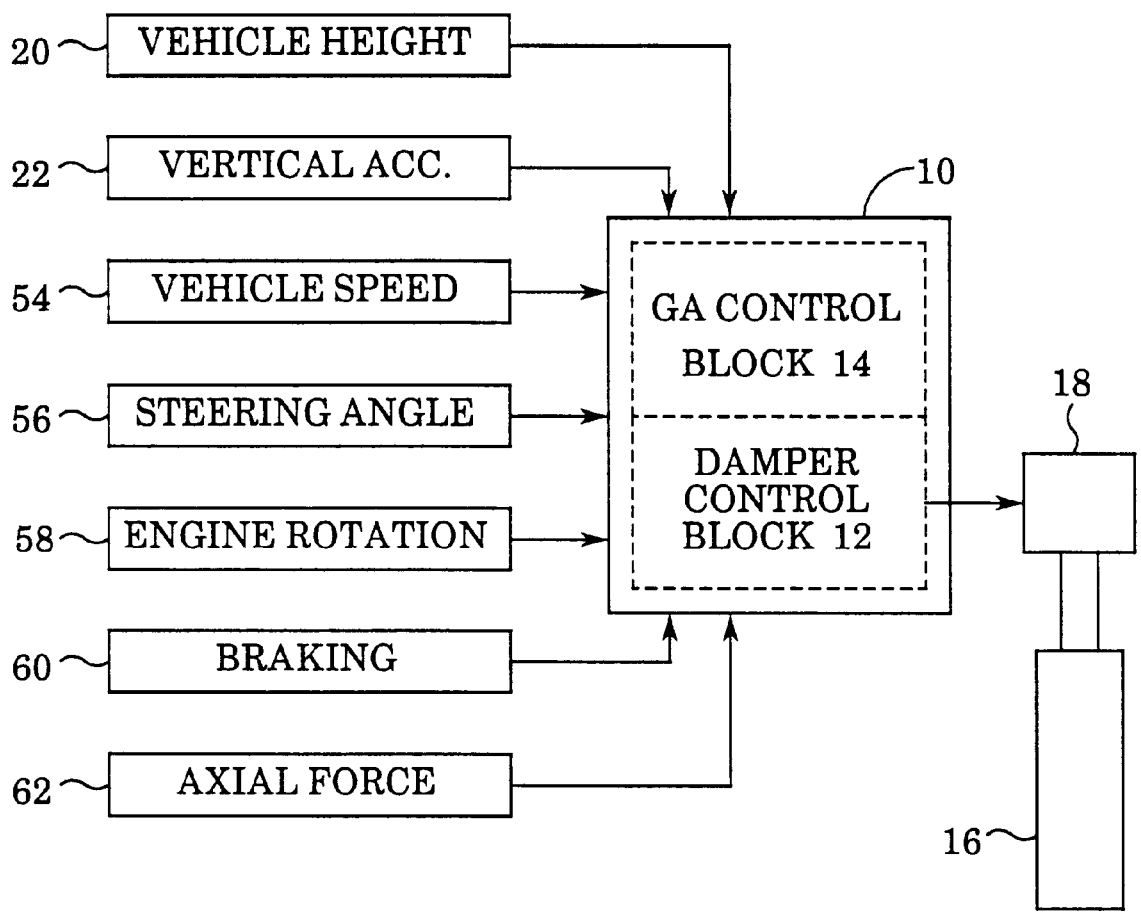
FIG. 1 is a diagrammatical illustration of the suspension control device according to the present invention, with sensors for supplying signals regarding operation environment of the vehicle to the suspension control device, and a variable damper forming a part of a suspension controlled by the suspension control device.

First referring to FIG. 1, there is schematically shown a basic construction of the suspension control device according to the present invention. In the construction shown in FIG. 1, the suspension control device generally designated by reference numeral 10 comprises a damper control block 12 and a genetic algorithm (abbreviated as GA hereinbelow) control block 14. A damper schematically shown as 16 is incorporated in the suspension of a vehicle not totally shown in the figure, to support a corresponding portion of a vehicle body (not shown) upon a corresponding vehicle wheel (not shown) in parallel with a suspension spring (not shown). Such a general construction of the vehicle suspension is very well known in the art. The suspension to which the present invention is applied does not differ from such a traditional construction as long as the above-mentioned basic construction is concerned. The difference is in that the damper 16 is equipped with an actuator 18 which changes the damping coefficient of the damper according to a control signal supplied by the suspension control device according to the present invention. An example of such a variable damper is described in Japanese Patent Laid-open Publication 3-276806 filed by the assignee of the present application.

The suspension control device 10 is supplied with a signal regarding vehicle height, i.e. displacement of the vehicle body relative to the vehicle wheel, from a vehicle height sensor 20, and a signal regarding vertical acceleration of the vehicle body from a vertical acceleration sensor 22. In addition to these basic sensors, in order to carry out various embodiments described hereinbelow, the suspension control device 10 is further supplied with other signals regarding such as vehicle speed from a vehicle speed sensor 54, steering angle from a steering angle sensor 56, engine rotation speed from an engine rotation speed sensor 58, braking condition from a brake sensor 60 and axial force acting through the damper from an axial force sensor 62 made of a piezo element or the like, according to the necessity of each embodiment. In this connection, it will be noted that some of these signals are processed by appropriate band pass filters before they are processed in the GA control block 14 or the damper control block 12, for the purpose of eliminating noise or modifying the control performance to a desired mode. Such an art of filtering oscillatory signals for a desired band of signals is well known in the art. Further, it will be noted that, since the present invention which provides a high grade suspension control will be applied to four wheeled vehicles, the damper 16 and the suspension control device 10 are provided for each one of the four wheels of a vehicle, and accordingly, the vehicle height sensor 20 and the vertical acceleration sensor 22 are those mounted around a corresponding one of the four wheels to detect the height and the vertical acceleration of the corresponding portion of the vehicle body, including such a case that no sensor is in fact provided corresponding to a particular wheel, while the vehicle height or vertical acceleration at that point is deduced by a conversion calculation of the kinetic motion of the vehicle body. Still further, it is to be noted that, since such behaviors of the vehicle as the heaving, pitching, rolling and warping are based upon the interrelation of all suspensions, the suspension control device 10 of each wheel is not completely independent from those of other wheels. Under acknowledgment of those situations, still in the following, the invention will be described with respect to a suspension of a single wheel for the purpose of brevity as long as the interrelation between the control of a plurality of wheels is not essential. In any event, the damper control block or blocks 12 and the GA control block or blocks 14 are in fact provided by a single micro-computer.

The variable damper 16 is changeable over among n stages to present n different values of damping coefficient. Such n stages may each be distinctively set up or may be defined as each corresponding range in a continuously changeable damping coefficient. In variable dampers, it is generally possible that the value of damping coefficient at each stage is variably controllable such that the n damping stages provide a variable distribution of damping coefficients according to variation of control signals. Therefore, the variable dampers can provide a variable distribution of damping coefficient not only for meeting with the change of the ratio Vb/Vs in realizing a sky hook damper but also for modify the sky hook damping coefficient Cs so that the damper is adapted to changes of load of the vehicle, if the distribution of the damping coefficient is properly controlled. Further, if the distribution of the damping coefficients is appropriately controlled in a self evolving manner, the damping performance would be adapted to compensate for fuzzy factors such as a time delay or a mismatching in the control of Vb/Vs particular to each vehicle which are too much complicated to be theoretically analyzed and settled.

Figure 2A:
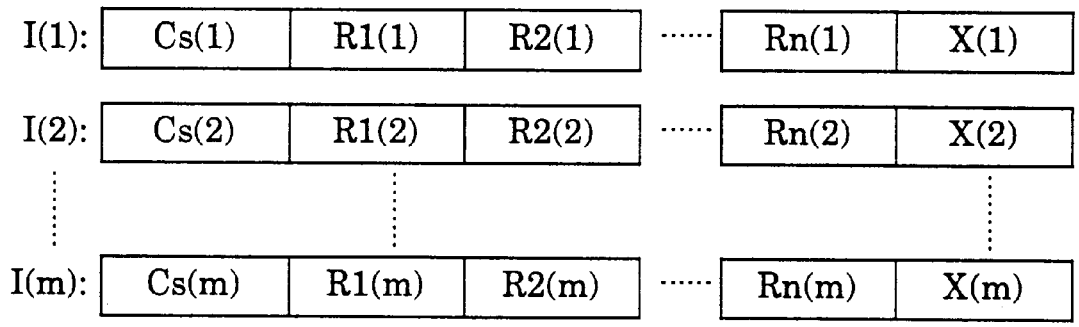
FIGS. 2A, 2B and 2C are diagrammatical illustrations of an embodiment of the group of schedules handled by the suspension control device according to the present invention.

In order to control the damping coefficient of such n staged variable damper, a group of schedules I(j) (j=1~m) are prepared as shown in FIG. 2A, wherein each schedule I(j) has a value Cs(j) for the sky hook damping coefficient, a distribution of factors R1(j), R2(j), . . . Rn(j) representing the ratio Vb/Vs of the sky hook theory, and valuation X(j) of each schedule. Such schedules each having a plurality of information units for controlling the suspension via the control of the damping coefficient of the damper may be fictionalized to living individuals each having a set of genes and endowed with a probability of infinite evolution for better adaptation to changing environment, by changing genes in hybridization between the individuals and even by mutations, if an appropriate number of such schedules are prepared to form a survivable group of same genus.

Figure 2B:
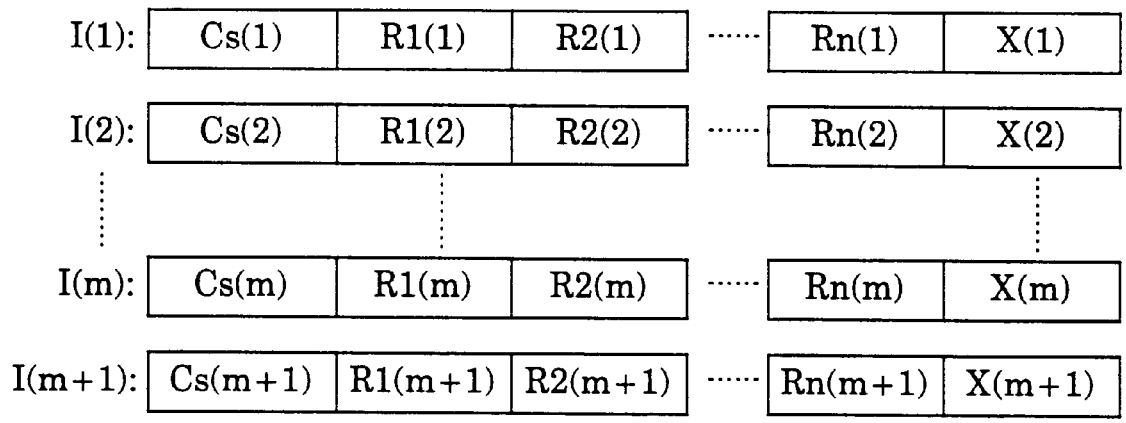
Figure 2C:
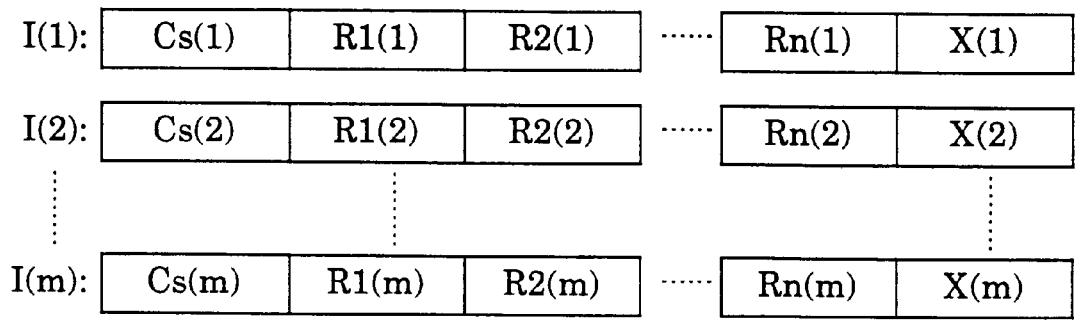

Thus, the GA control block 14 maintains a group of schedules such as I(1)~I(m) as stored therein but periodically generates a new schedule I(m+1) as shown in FIG. 2B by hybridizing two of the schedules I(1)~I(m) selected therefrom according to a predetermined genetic algorithm including mutation, then tests all of the schedules I(1)~I(m+1) under the current operation environment of the vehicle to evaluate the performance thereof. As an embodiment, the evaluation may be made based upon how small the vertical acceleration of the vehicle body is, by integrating the vertical acceleration of the vehicle body detected by the sensor 22 during the testing period, and calculating respective valuations X(j) as a reciprocal of the integration or a value proportional thereto, and then ranks the schedules I(1)~I(m+1) according to the magnitude of X(j). Then, the GA control block 14 selects the highest ranked schedule for use in the succeeding control of the suspension, while it deletes the lowest ranked schedule, thereby maintaining generally a constant number of schedules, as shown in FIG. 2C. The group of schedules I(1)~I(m) of FIG. 2C may conveniently be called a group of new or next generation, although it consists of m−1 old schedules and one new schedule, provided that the newly generated schedule has replaced an old schedule, or it will also often happen that the schedules of the new group do not differ from those of the former generation, however, with or without changes of the ranking, when the newly generated schedule was immediately deleted. Although FIGS. 2A, 2B and 2C show an embodiment that only one schedule is generated in one season of hybridization, more than one new schedules may be generated at the same time according to other embodiments. In any event, the speed of the change of generation is to be determined based upon a balance between the stability of the suspension performance and the quick adaptability of the suspension to changes of the operation environment.

The genetic algorithm for conducting the hybridization may be appropriately determined. A theory of probability may be applied to. The chances of incorporating mutation may also be controlled according to a theory of probability.

Figure 3A:
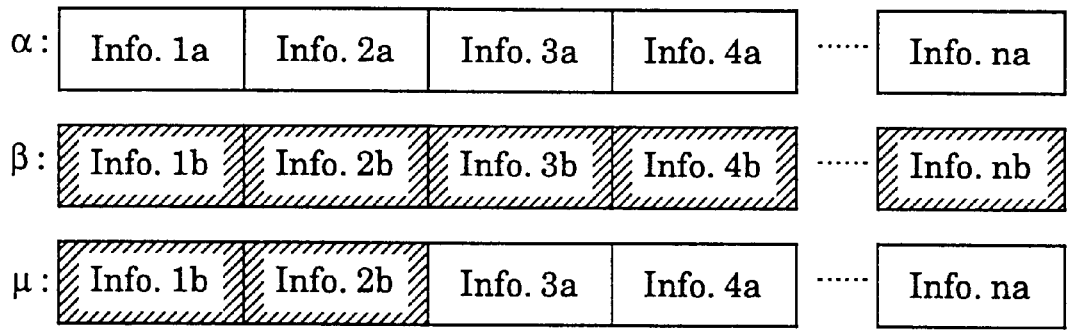
FIGS. 3A, 3B and 3C are views similar to FIGS. 2A~2C, illustrating examples of hybridization conducted by the present invention.
Figure 3B:
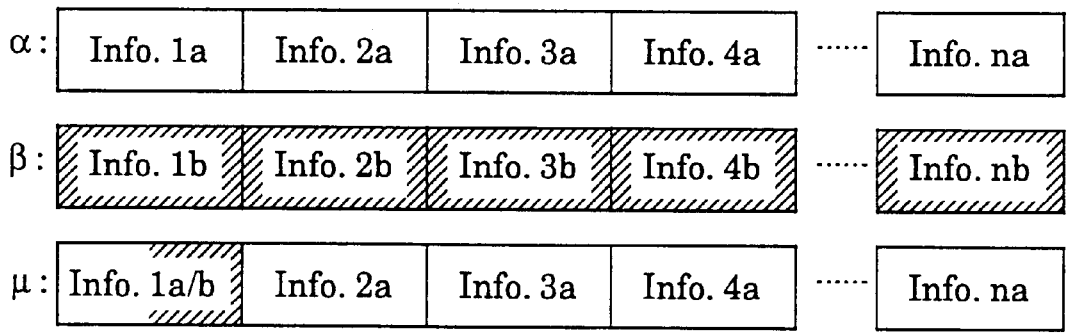
Figure 3C:
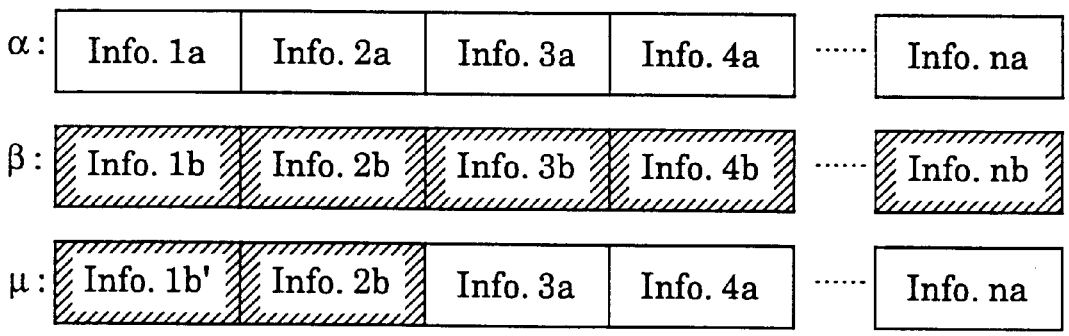

FIGS. 3A, 3B and 3C show examples of hybridization. In the case of FIG. 3A, a new individual (schedule) $\mu$ is generated from individuals $\alpha$ and $\beta$ by mixing corresponding information units (genes) of the parents. The information units may each be constructed by a binary digital number such as e.g. 10101010. Therefore, the hybridization may be made as shown in FIG. 3B, such that a new individual $\mu$ is almost a copy of individual $\alpha$, except that a part of information unit $1a$ is replaced by a corresponding part of individual $\beta$, although such a hybridization would not occur between actual living individuals. FIG. 3C shows a mutation that a new individual $\mu$ is similar to individual $\mu$ of FIG. 3A, but the information unit $1b$ has mutationally changed to $1b'$.

Now, referring to a flowchart shown in FIG. 4, the control process of the suspension according to the present invention will be described, as using a group of schedules such as shown in FIG. 2A prepared for the sky hook damping.

Figure 5:
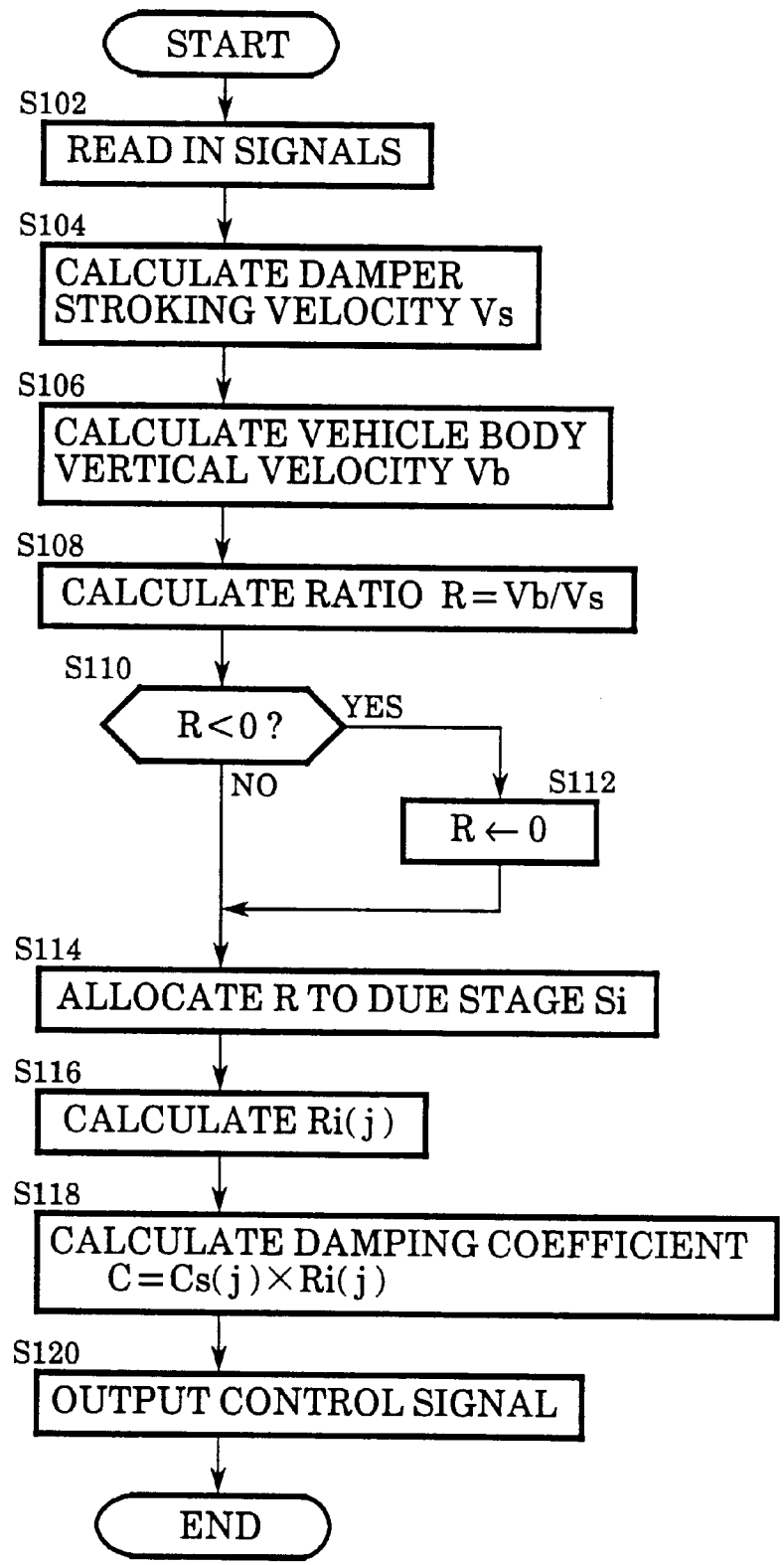
FIG. 5 is a flowchart showing the process conducted in steps 100 and 400 of the flowchart of FIG. 4.

When the process was started, in step 50, time count T of a timer is reset to zero, and then in step 100, the suspension is controlled (i.e. the damping coefficient of the damper is controlled) according to the sky hook theory by following a control routine such as shown in FIG. 5. However, the schedule I(j) used in this step will be changed from time to time as described hereinbelow. In step 150, the time count T is incremented by T1. In step 200, it is checked if the time count T has exceeded a predetermined threshold value Tc1. If the answer is no, the control process returns to step 100 to continue the same control, while if the answer is yes, the control process proceeds to step 250, and a new schedule I(m+1) is generated. Then in step 300, the time count T is reset to zero, while parameter j is initialized to 1.

In step 400, the testing of the existing schedules is started. So, first, the suspension is controlled by using schedule I(1). In step 420, the time count T is incremented by T2, and in step 440, it is checked if the time count T has exceeded a threshold value Tc2. If the answer is no, the control process returns to step 400 to continue the testing of the same schedule, whereas if the answer is yes, the control process proceeds to step 460, and the valuation X(1) of schedule I(1) is calculated.

In step 480, the parameter j is incremented by 1, and in step 500, it is checked if the parameter j has exceeded m+1. If the answer is no, the control process returns to step 350, and schedule I(2) is tested. Thus, the testing is continued until all schedules I(1)~I(m+1) are tested.

Figure 4:
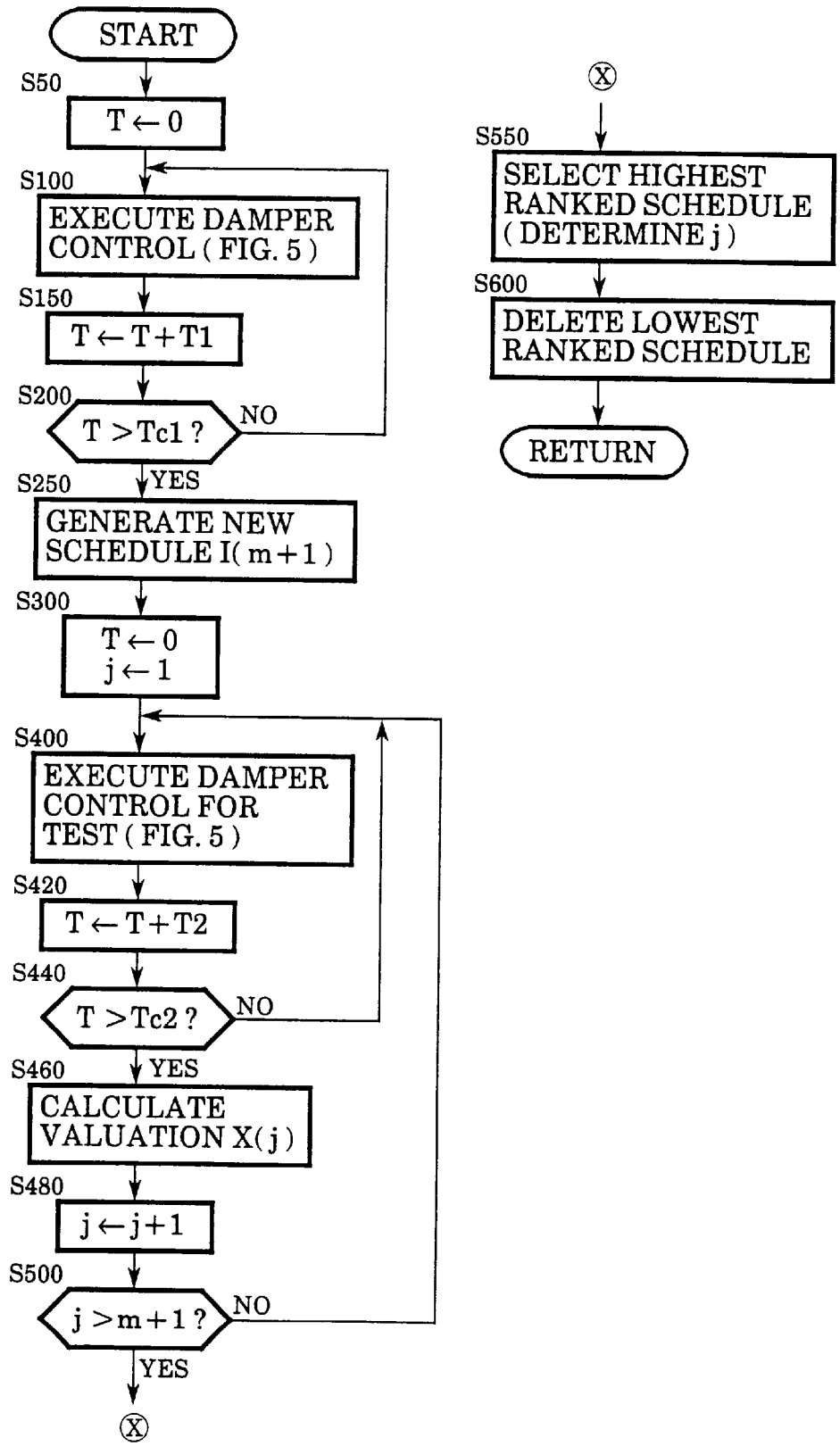
FIG. 4 is a flowchart showing a basic control process conducted by the suspension control device according to the present invention.

In step 550, a highest ranked schedule I(j) is selected for use in the control of step 100 in the next cycle of execution of the flowchart of FIG. 4, and then in step 600, the lowest ranked schedule is deleted.

FIG. 5 is a flowchart showing the operation of the damper control executed in steps 100 and 400 of the flowchart of FIG. 4.

When the control was started, in step 102, data such as the vehicle height detected by the sensor 20 and the vertical acceleration detected by the sensor 22 are read in. Then in step 104, the vehicle height is differentiated to obtain the stroking velocity of the damper Vs. In step 106, the vertical acceleration is integrated to obtain the vertical velocity Vb of the vehicle body. In step 108, ratio R of Vb/Vs is calculated. The value of ratio R will change from negative infinite to positive infinite passing through zero. However, there is no damper which provides a negative damping coefficient. This is a limit with respect to the performance of the sky hook damper. Therefore, in step 110, it is checked if R is negative, and if so, R is made zero in step 112.

Now in step 114, according to the value of ratio R, a due damping stage is determined. Variable dampers having a mechanism for changing the opening area of a throttling opening will generally be able to provide infinite damping coefficient, as it is readily available by the throttle opening being totally closed. However, as a matter of practice, it will not be desirable that the vehicle body and the vehicle wheel is rigidly connected even at a moment, as it is probable that the vehicle wheel casually rides on a projection just at the moment. Therefore, the maximum value of the damping coefficient should desirably be limited to a certain finite moderate value even by sacrificing the sky hook theory. Thus, the full range of damping coefficient will be divided into a certain number of stages distributed between the maximum value thereof and substantially zero, regardless whether such stages are distinctly set up or are only conceptionally defined within a continuously changeable range of damping coefficient. According to such staging of the damper, each particular ratio R obtained through step 110 or 112 is allocated to a corresponding due stage.

Figure 6:
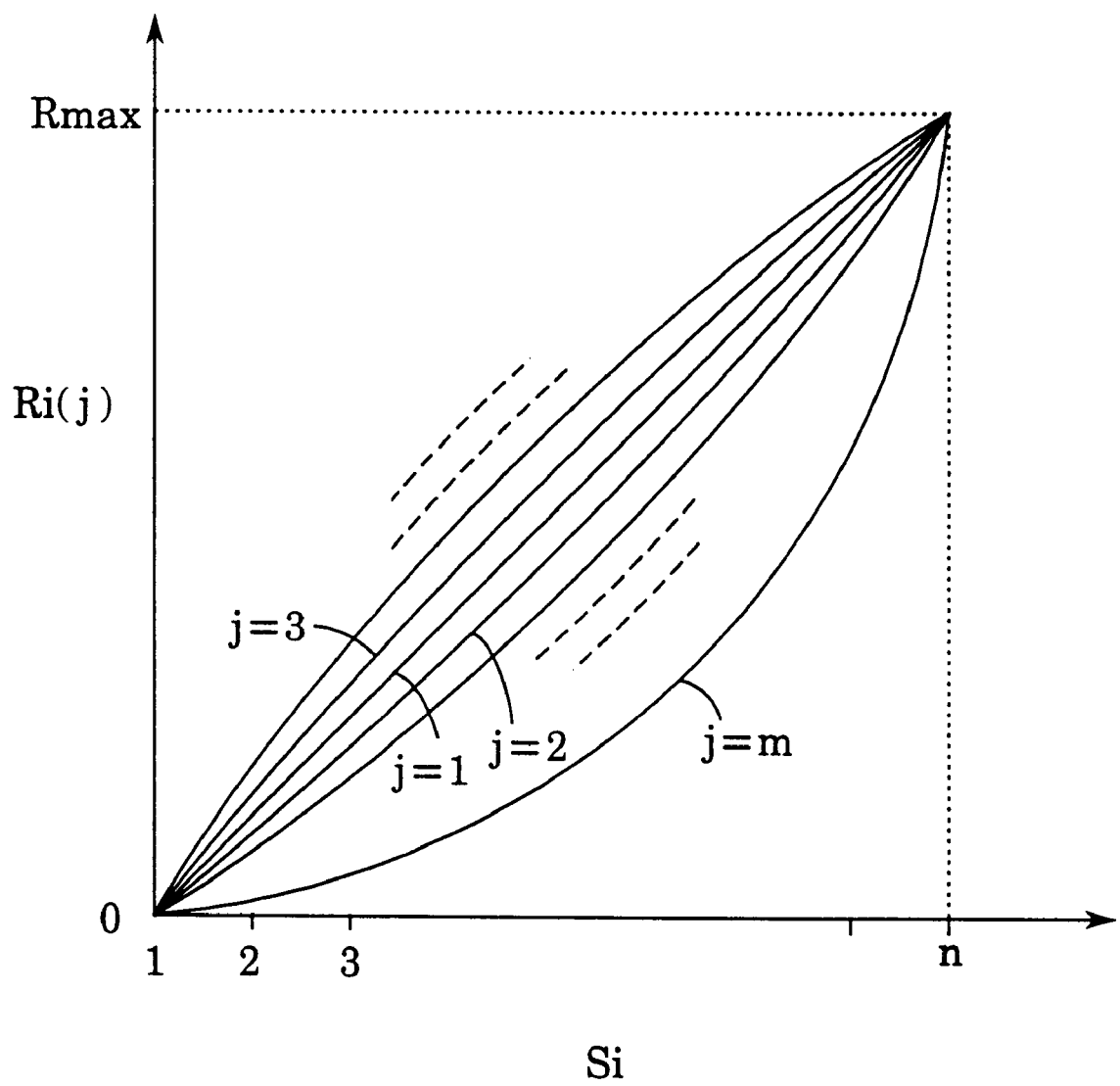
FIG. 6 is a graph showing an example of the evolutional variations effected for the contents of information units Ri(j) of FIGS. 2A~2C.

In step 116, each value of the information units Ri(j) shown in FIG. 2A is obtained according to the schedule I(j) currently used for the damper control. The relationship between the above-mentioned stages and the information unit Ri(j) will be such as exemplarly shown in FIG. 6, wherein the stages are arranged along the abscissa as Si (i=1~n), while the information units Ri(j) are arranged along the ordinate. In the shown example, schedule I(1) provides a linear relationship between R and Ri(1), while schedule I(m) provides a relationship between R and Ri(n) substantially biased from the linear relationship. It is to be noted that the performance curves of j=1~m2 are not fixed but will change from time to time according to the progress of the above-mentioned hybridization and selection. Therefore, any difference of damping performance with respect to each product within a manufacturing allowance or a change of the damping performance according to the normal aging effect is automatically compensated for and makes no problem. In other word, all of the performance curves of schedule I(j) such as shown in FIG. 6 are alive and changeable with the progress of operation of the suspension according to the operation environment thereof.

In step 118, the damping coefficient C for the actual damper to be set up is calculated as C=Cs(j)×Ri(j), by using Cs(j) of the selected schedule I(j). Then in step 120, a signal for controlling the damper to provide a damping coefficient of the value Cs(j)×Ri(j) is dispatched toward the actuator 18.

Here again it is to be noted that if there is a difference between the damping coefficient instructed by the control signal to be C and the actual coefficient set up thereby due to an allowance of the product quality control and/or aging of each product, such a difference is automatically compensated for by a corresponding shifting and/or variation of the schedules targeted for the best operation quality.

Figure 7:
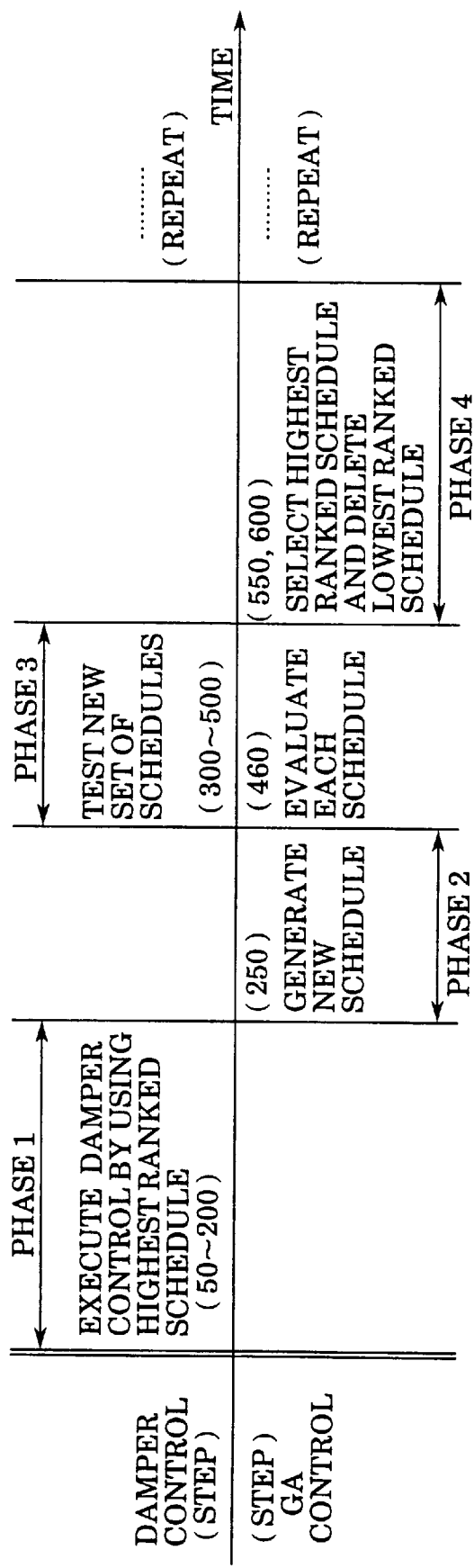
FIG. 7 is a time sequence chart showing the progress of the control process conducted by the suspension control device according to the present invention.

FIG. 7 shows the time sequence of the suspension control operation conducted according to the flowchart of FIG. 4, incorporating the flowchart of FIG. 5. As shown in FIG. 7, the suspension control operation includes Phase 1 in which the control of the suspension is carried out by the damper control block 12 according to steps 50~200 by employing the highest ranked schedule obtained in the schedule renewal operation of the GA control block 14 of a preceding cycle, Phase 2 in which a new schedule is generated by the GA control block 14 according to step 250, Phase 3 in which all schedules including the newly generated schedule are tested by the damper control block 12 according to steps 300~500, while the performance of each schedule under the current operation environment is evaluated by the GA control block according to step 460, and Phase 4 in which the highest ranked schedule is selected for the next use, while the lowest ranked schedule is deleted, by the GA control block 14 according to steps 550 and 600. The same series of Phases 1~4 are repeated thereafter. The time duration of the respective stages may desirably be such as several hours to several tens hours for Phase 1, about one hour for Phase 3, and only a moment for Phases 2 and 4.

Although only one new schedule was generated at each one cycle of operation in the above described embodiment, it will be apparent that more than one new schedules may be generated at one cycle. Further, although all schedules including the old and the newly generated schedules are tested in the above described embodiment, such and other modifications will be readily possible that the newly generated schedule and only some highly ranked schedules are tested.

Figure 8:
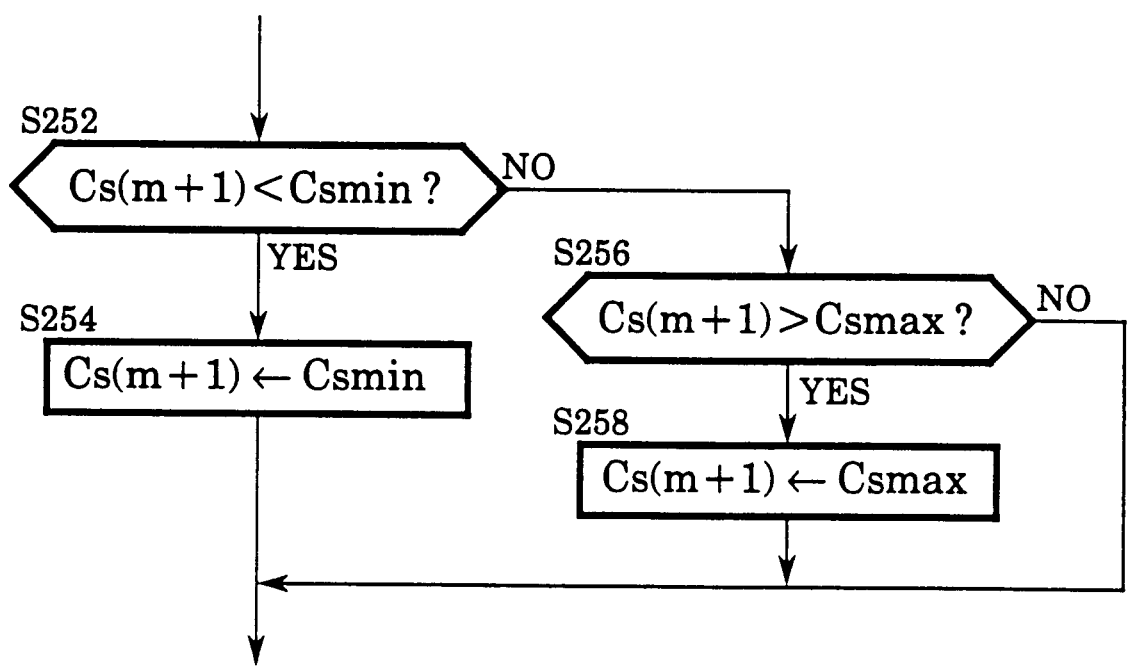
FIG. 8 is a partial flowchart to be inserted between steps 250 and 300 of the flowchart of FIG. 4, as a modification thereof.

FIG. 8 shows additional steps to be inserted between the steps 250 and 300 of the flowchart of FIG. 4, as a modification of the control process of FIG. 4. According to this modification, after a new schedule was generated in step 250 of FIG. 4, it is checked if the value of the sky hook damping coefficient Cs(m+1) of the newly generated schedule I(m+1) is not improperly diverging. For this purpose, in step 252, it is checked if Cs(m+1) is smaller than Csmin predetermined as a lower limit of the sky hook damping coefficient, and if the answer is yes, the control process proceeds to step 254, and Cs(m+1) is made Csmin. On the other hand, if the answer of step 252 is no, then in step 256, it is checked if Cs(m+1) is larger than Csmax predetermined as an upper limit of the sky hook damping coefficient, and if the answer is yes, then in step 258, Cs(m+1) is made Csmax. If the answer of step 256 is no, step 258 is bypassed. By such an arrangement, evolution of new generations toward useless directions will be prevented.

Further, although not particularly illustrated, for the value of each of the information units Ri(j) and other modifications thereof described hereinbelow, an appropriate maximum and minimum limit may be set up according to a process similar to the above-mentioned steps 252~258 so that the genetic evolution of the schedules does not get into a useless divergence.

Figure 9A:
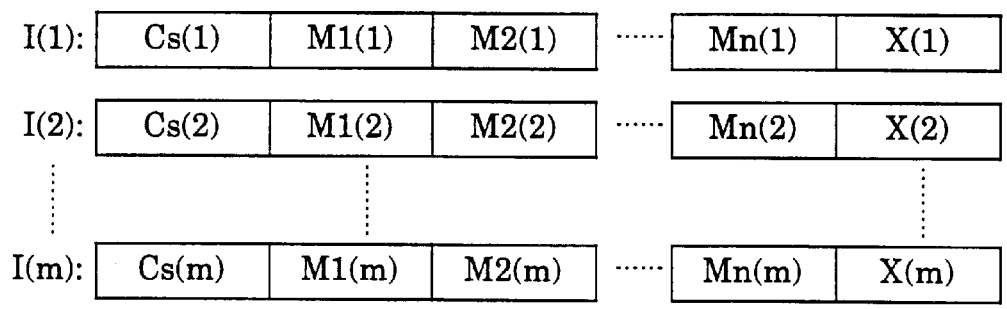
FIGS. 9A is a diagram similar to FIG. 2A, showing another embodiment of the schedules handled by the suspension control device according to the present invention.
Figure 9B:
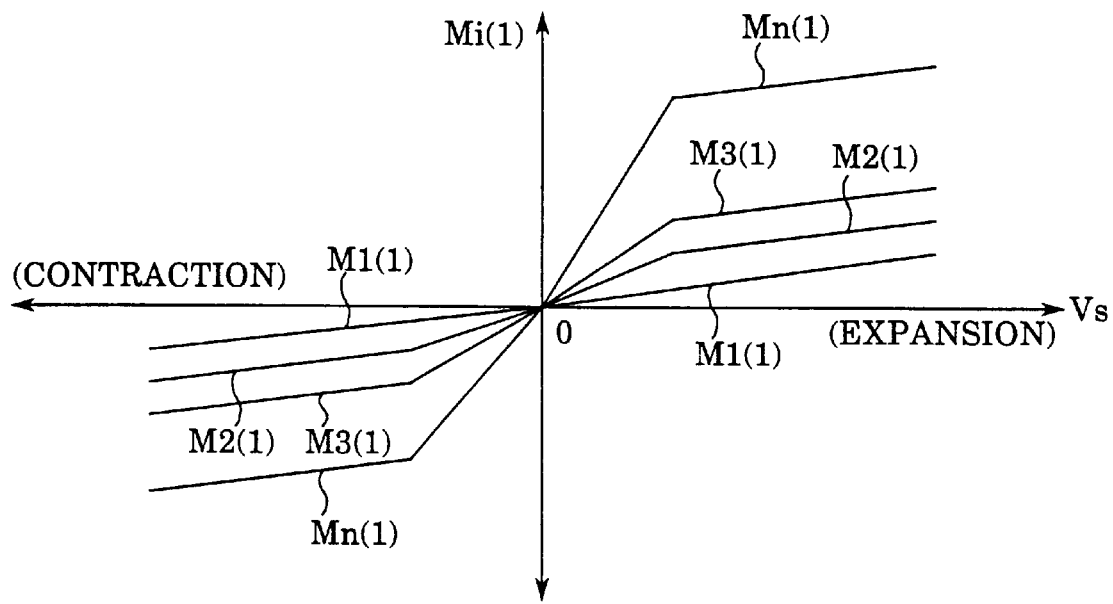
FIG. 9B is a map showing an example of the contents of information units Mi(1) (i=1~n) of FIG. 9A.

FIGS. 9A and 9B show a modification with respect to the schedules I(j) (j=1~m) of FIG. 2A. In this modification, Ri(j) of FIG. 2A are replaced by Mi(j) each being adapted to change according to the stroking velocity Vs of the damper, with identification of the sign of Vs, i.e. if the stroke is an expansion stroke or a contraction stroke, as shown in FIG. 9B. (FIG. 9B shows only Mi(1) as an example.) This modification provides a further improvement of the suspension performance in that, apart from the change of the damping coefficient according to Cs(j)×Vb/Vs due to the sky hook theory, the damping coefficient is modified according to the stroking velocity of the damper to be made softer as the stroking velocity increases, so as to retain the suspension against becoming harder as the stroking velocity increases, thereby contributing to a further improvement of the riding comfortableness of the vehicle by more definitely excluding such a problem that the damper which gets harder according to increase of the stroking velocity affects the suspension control due to even a minute mismatching of control timing or a casual obstacle.

As will be noted in FIG. 9B, by replacing Ri(j) of FIG. 2A by a product of Mi(j) and Vs, it is possible to control the damping performance dependent on the stroking velocity to be different between the expansion stoke and the contraction stroke.

FIG. 10 shows a further modification of the group of schedules. According to this modification, a plurality of groups of schedules are prepared such that a more adaptive group of schedules can be selected from such a plurality of groups for use according to each particular operation environment of the vehicle. So in the embodiment shown in FIG. 10, three groups of schedules are prepared for selective use according to a difference in the frequency band of the vertical acceleration of the vehicle body, such that group A is used for a relatively low frequency band, group B is used for a medium frequency band and group C is used for a relatively high frequency band.

Figure 11:
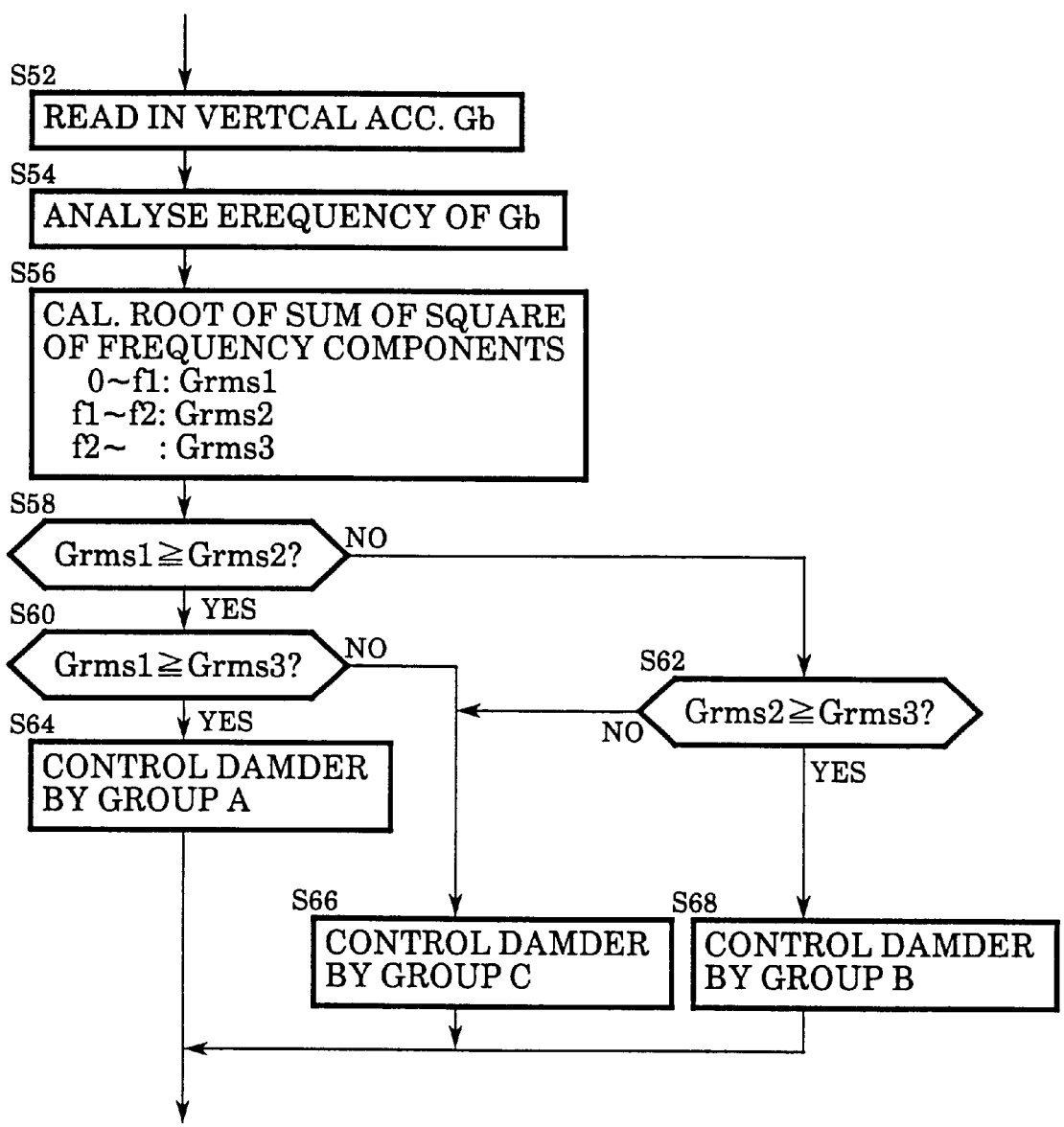
FIG. 11 is a partial flowchart to replace step 100 of the flowchart of FIG. 4 when such a plurality of groups of schedules are handled by the suspension control device according to the present invention, as a modification.

When these groups of schedules are used, the step 100 of the flowchart of FIG. 4 is replaced by those steps shown in FIG. 11. In step 52, the suspension control device 10 reads in the vertical acceleration Gb of the vehicle body from the sensor 22. In step 54, the frequency of the vertical acceleration is analyzed, and in step 56, a root of sum of square is calculated with respect to frequency components belonging to bands of 0~f1 Hz, f1~f2 Hz and higher than f2 Hz, so as to provide Grms1, Grms2 and Grms3, respectively.

Then, in step 58, it is checked if Grms1 is equal to or greater than Grms2. If the answer is yes, then in step 60, it is checked if Grms1 is equal to or greater than Grms3. If the answer is yes, then in step 64, Group A is selected for use, while if the answer is no, then in step 66, Group C is selected for use. If the answer of step 58 is no, in step 62, it is checked if Grms2 is equal to or greater than Grms3. If the answer is yes, in step 68, Group B is selected for use, while if the answer is no, in step 66, Group C is selected for use.

When a plurality of groups of schedules are prepared and selectively used as described above, the generation of a new schedule, testing and ranking of a new set of schedules, and deletion of the lowest ranked schedule according to the steps 300~600 of the flowchart of FIG. 4 may be made only with respect to the group selected for use, although other options in this regard will be readily thought of within the scope of the present invention.

Figure 12:
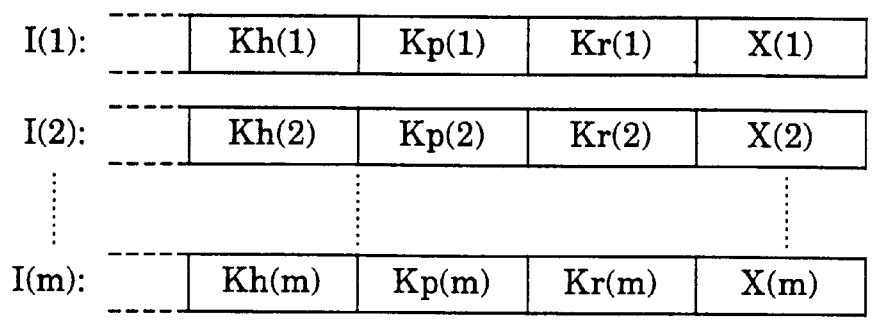
FIG. 12 is a diagram similar to FIG. 2A, showing still another embodiment of the schedules constructed for adapting the suspension control device of the present invention to heaving (h), pitching (p) and rolling (r) performance of the vehicle.

FIG. 12 shows a further modification of the schedules to incorporate weighing factors of heave, pitch and roll of the vehicle body as the information units processed for evolution by the genetic algorithm according to the present invention. As well known in the art of four wheeled vehicle suspension, when the vertical acceleration of the vehicle body at each of the front left, front right, rear left and rear right wheel positions is detected by a corresponding sensor, as denoted as Gzfl, Gzfr, Gzrl and Gzrr, then by integrating these accelerations on time basis, the corresponding vertical velocities of the vehicle body at the front left, front right, rear left and rear right wheel positions are obtained, as denoted as Vzfl, Vzfr, Vzrl and Vzrr. Therefore, denoting the rate of heaving, pitching and rolling movements of the vehicle body as Gh, Gp and Gr, they are evaluated as follows:

$$Gh=(Vzfl+Vzrr)/2$$

$$Gp=(Vzfr-Vzrr)/2$$

$$Gr=(Vzfl-Vzfr)/2$$

In order to improve the riding comfortableness of the vehicle, it is already known in this art to modify the balance among Gh, Gp and Gr by respective factors, as denoted as Kh, Kp and Kr, and then re-convert these rates into the vertical velocities at the four wheel positions for use in the suspension control, as follows:

$$Ghm=Kh \times Gh$$

$$Gpm=Kp \times Gp$$

$$Grm=Kr \times Gr$$

$$Vzmfl=(Ghm+Gpm+Grm) \times 3/(Kh+Kp+Kr)$$

$$Vzmfr=(Ghm+Gpm+Grm) \times 3/(Kh+Kp+Kr)$$

$$Vzmrl=(Ghm-Gpm+Grm) \times 3/(Kh+Kp+Kr)$$

$$Vzmrr=Vzmfr-Vzmfl+Vzmrl$$

The information units Kh(j), Kp(j) and Kr(j) of FIG. 12 represent the above-mentioned Kh, Kp and Kr, respectively, as incorporated in the schedules I(j) to be processed for evolution according to the genetic algorithm as described above. Therefore, it will be appreciated that an improvement of the riding comfortableness influenced by the balance among the heaving, pitching and rolling performances of the vehicle is also obtained as organically interrelated with the control of the damper according to the sky hook theory. However, it will apparently be appreciated that the control of Kh, Kp and Kr according to the above-mentioned genetic algorithm may be carried out independently of the sky hook suspension control, or a normal suspension control.

The evaluation of the schedules may be made by the magnitude and/or frequency of the heaving, pitching and rolling according to appropriate measuring means which are already well known in the art. Further, when the damping coefficient is varied for improving the rolling performance, it will be desirable that the evaluation of the schedules is made in relation to the turning performance of the vehicle. The vehicle speed sensor 54 and the steering angle sensor 56 shown in FIG. 1 will provide information necessary to make such evaluation.

Although the present invention has been described in the above on the basis that the suspension is controlled according to the sky hook theory in consideration that, since the present invention seeks to improve the suspension performance by varying the damping coefficient of the suspension damper according to the genetic algorithm, the effect of the present invention will be most distinguishably exhibited when the damper is frequently controlled according to the sky hook theory. However, the particular merit of the present invention that the suspension performance highly sensitively liable to external and internal operational environments difficult to be estimated at high precision by theory is automatically improved will also be enjoyed when the damping coefficient of the damper is controlled according to other principles different from the sky hook theory.

Figure 13:
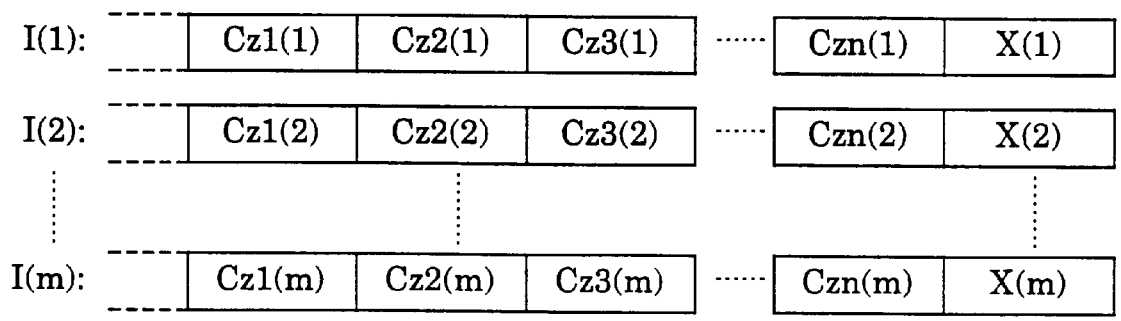
FIG. 13 is a diagram similar to FIG. 2A, showing still another embodiment of the schedules constructed for controlling a variable suspension as a conventional (not sky hook) suspension.

So, for example, a group of schedules for controlling the suspension damper according to the present invention may be such as shown in FIG. 13, wherein a group of schedules are prepared to have a set of information units Czi(j) each specifying a corresponding damping coefficient determined according to the vertical acceleration of the vehicle body. In this embodiment, the GA control block 14 arranges the schedule of changing over the damping stages of the damper by determining threshold values of the vertical acceleration Gb of the vehicle body for changing over the respective damping stages of the damper to provide the corresponding damping coefficient Czi(j). Therefore, these schedules will be used for controlling the damper as a normal damper (not sky hook). For using these schedules, it will be enough if the flowchart of FIG. 4 is modified such that steps 100 and 400 are replaced by a normal damping control step for changing over the damping stages among Czi(j) according to appropriately staged threshold values corresponding to Si of FIG. 6, in the same manner as described with reference to the basic embodiment employing the sky hook theory.

Figures 14A, 14B, 15:
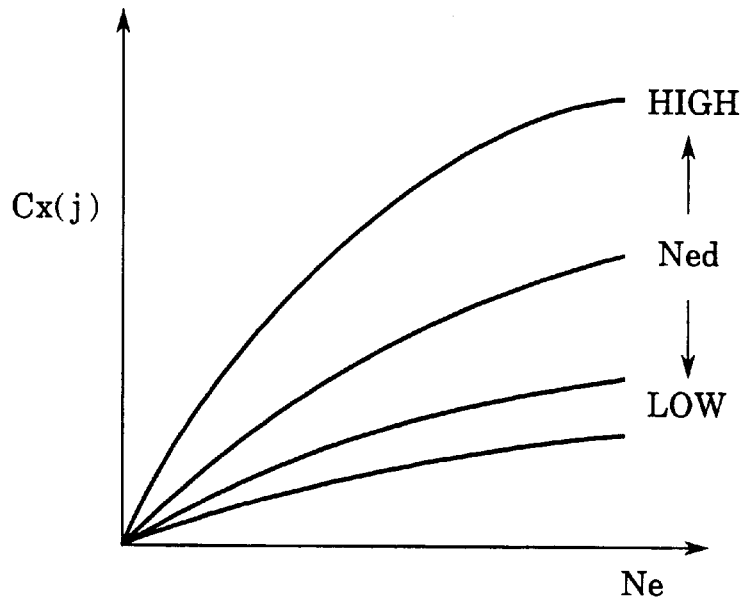
FIG. 14A is a diagram similar to FIG. 2A, showing still another embodiment of the schedules constructed for adapting the suspension control device of the present invention to changes of engine rotation speed and changing rate thereof, as still classified according to vehicle speed (l, m, h)
FIG. 14B is a map showing an example of the contents of information units Cx(j) (x=l, m, h) (j=1~n) of FIG. 14A.
FIG. 15 is a diagram similar to FIG. 2A, showing still another embodiment of the schedules constructed for adapting the suspension control device of the present invention to braking of the vehicle, as further classified according to vehicle speed (l, m, h)

FIGS. 14A and 14B show a further embodiment of a group of schedules controllable according to the principle of the present invention. The information units of the group of schedules I(j) (j=1~m) shown in FIG. 14A may be added to the schedules of FIG. 2A or others described above, or may be used as an independent group of schedules for controlling the vehicle suspension alone or in combination with those preceding schedules. In the schedules of FIG. 14A, information units Cl(j), Cm(j) and Ch(j) are each a map such as shown in FIG. 14B, specifying a set of relationship among the damping coefficient Cx(j) to be instructed for the damper, engine rotation speed Ne and changing rate Ned of engine rotation speed. Such maps are prepared for a low range (Cl(j)), a medium range (Cm(j)) and a high range (Ch(j)) of vehicle speed, respectively. Vehicle speed and engine rotation speed are available from the sensors 54 and 58 of FIG. 1, respectively.

It will be appreciated that, by using such a group of schedules to be evolved for a better adaptation of the suspension for obtaining more comfortable drive feeling in the balance between stiffness and softness of the suspension according to the driving speed and the gear position (dependent upon vehicle speed and engine rotation) by evolving hybridization of the schedules in the same manner as described with reference to the preceding embodiments, a further improvement of the vehicle suspension will be accomplished. The evaluation of the schedules in this embodiment may also be made according to the vertical acceleration of the vehicle body.

FIG. 15 shows a still further embodiment of a group of schedules controllable according to the principle of the present invention. In this embodiment, information units Ckl(j), Ckm(j) and Ckh(j) of the group of schedules I(j) (j=1~m) represent damping coefficients selected according to the rate of braking detected by the brake sensor 60 of FIG. 1, specifying the damping coefficient to be adopted according to the rate of braking, wherein Ckl(j), Ckm(j) and Ckh(j) are those for a low range, a medium range and a high range of vehicle speed, respectively. Information units Ds(j) specify a maximum number of stages or a maximum difference of damping coefficient to be allowed for an abrupt change of the damping coefficient in response to a detection of braking. The schedules of FIG. 15 may also be added to the schedules of FIG. 2A or others described above with an appropriate overriding connection means, such that the schedules of FIG. 15 are only executed by overriding the schedules of FIG. 2A or others when the brake pedal was depressed beyond a predetermined depth, or may be used as an independent group of schedules for controlling the vehicle suspension, alone or in combination with one or more of the preceding groups of schedules. It will be appreciated that a group of these schedules can also evolve by hybridization such that the drive feeling of the vehicle during braking is optimized in spite of changes of operation environment.

Figure 16A:
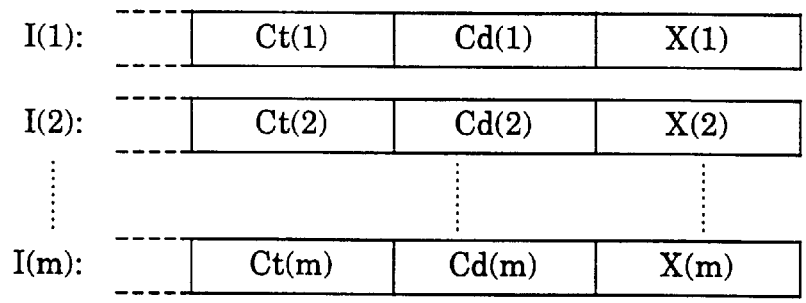
FIG. 16A is a diagram similar to FIG. 2A, showing still another embodiment of the schedules constructed for limiting an allowable largest value of the damper coefficient according to the axial force acting through the damper and changing rate thereof.
Figure 16B:
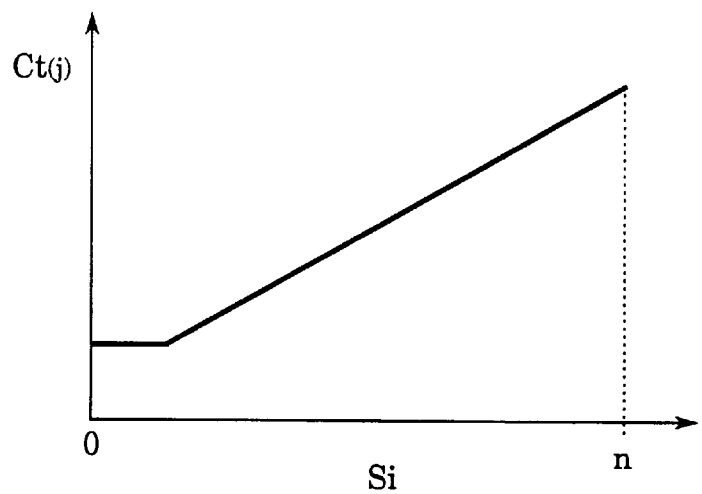
FIG. 16B is a map showing an example of the contents of information units Ct(j) of FIG. 16A dependent on the axial force, with respect to Ct(1)
Figure 16C:
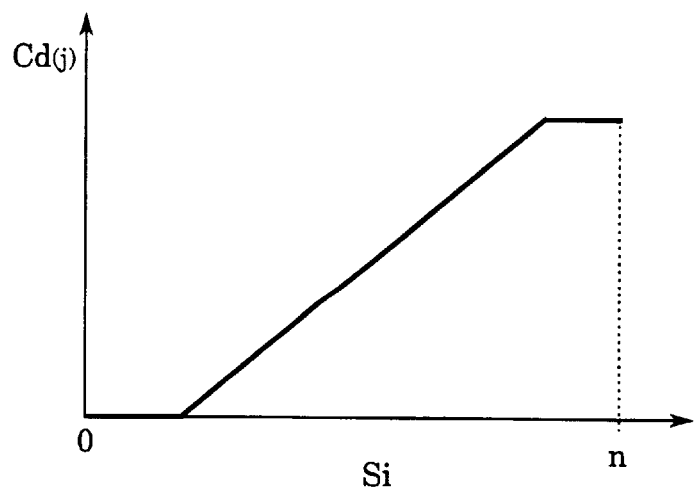
FIG. 16C is a map showing an example of the contents of information units Cd(j) of FIG. 16A dependent on the changing rate of axial force, with respect to Cd(1).

FIG. 16A shows a still further embodiment of a group of schedules controllable according to the principle of the present invention. In this embodiment, information units Ct(j) and Cd(j) of each of the schedules I(j) (j=1~m) represent damping coefficient specifying threshold values of the axial force acting through the damper and the change rate thereof, respectively, against the current damping stage, so that the magnitude of the axial force and its change rate do not exceed the specified values. FIG. 16B shows an example of the relationship between Ct(j) and the stages (Si), and FIG. 16C shows an example of the relationship between Cd(j) and the stages Si. It will be appreciated that the schedules of this embodiment may desirably be added to all of the preceding embodiments of schedules described above with an appropriate measure for letting the schedules of FIGS. 16A to 16C override those of the preceding schedules in the control of the damping coefficient according to the present invention. The axial force acting through the damper is obtained from the axial force sensor 62 shown in FIG. 1.

Although the present invention has been described in the above with respect to some preferred embodiments thereof, it will be apparent for those skilled in the art that other various modifications of the shown embodiments or similar embodiments are possible without departing from the scope of the present invention.

We claim:

1. A suspension control device for a suspension of a vehicle having a vehicle body and vehicle wheels each supporting the vehicle body at a corresponding portion thereof via the suspension, said suspension comprising a parallel combination of a spring and a damper having a means for varying damping coefficient thereof according to a control signal supplied thereto, said suspension control device comprising:

a means for storing a group of schedules each having a plurality of information units for controlling the variation of the damping coefficient of said damper;

a means for generating a new schedule by hybridizing more than one of said schedules selected from said group according to a predetermined genetic algorithm including mutation based upon a fictionalization that said schedules are living individuals each having said plurality of information units as a set of genes;

a means for evaluating each of said schedules under current operation environment of the vehicle to determine the ranking thereof in said group in improving a predetermined performance of the suspension;

a means for adopting a highest ranked schedule for controlling the damping coefficient of said damper;

a means for deleting a lowest ranked schedule to keep the number of said schedules forming said group substantially constant; and a means for generating said control signal based upon said highest ranked schedule.

2. A suspension control device according to claim 1, wherein said damper is controlled according to a sky hook theory, and said information units comprise value of the damping coefficient of a sky hook damper defined by the sky hook theory.

3. A suspension control device according to claim 2, wherein said new schedule generating means comprises a means for restricting the value of the damping coefficient of said sky hook damper of said newly generated schedule between an upper limit and a lower limit.

4. A suspension control device according to claim 1, wherein said damper is controlled according to a sky hook theory, and said information units comprise values of factors each dependent on ratio of vertical velocity of the vehicle body to vertical stroking velocity of said damper to be multiplied by the damping coefficient of a sky hook damper defined by the sky hook theory for determining the damping coefficient of said damper.

5. A suspension control device according to claim 4, wherein said factors are each a product of the vertical stroking velocity of said damper and a function of said vertical stroking velocity, the value of said function generally increasing along with increase of said vertical stroking velocity with a saturation.

6. A suspension control device according to claim 1, wherein said schedule group storing means is adapted to store a plurality of such groups, said suspension further comprising a means for selecting one of said plurality of groups as an object for selecting of the highest ranked schedule by said means for adopting the highest ranked schedule for controlling the damping coefficient of said damper.

7. A suspension control device according to claim 6, wherein said means for selecting one of said plurality of groups as an object for the selection of the highest ranked schedule by said highest ranked schedule adopting means comprises a means for detecting density of frequency components of vertical acceleration of the vehicle body according to a plurality of frequency bands, and a means for detecting one of said plurality of groups which is largest in said density so that the selection among said groups is so made as to select one having the largest density.

8. A suspension control device according to claim 1, wherein said information units comprise value of a factor for modifying rate of at least one of heaving, pitching and rolling of the vehicle body for reflecting heaving, pitching and rolling of the vehicle body on the control of the damping coefficient of said damper.

9. A suspension control device according to claim 1, wherein said information units comprise value of the damping coefficient of said damper to be targeted according to vertical acceleration of the vehicle body.

10. A suspension control device according to claim 1, wherein said information units comprise an allowable largest value of the damping coefficient of said damper targeted according to engine rotation speed and changing rate thereof.

11. A suspension control device according to claim 10, wherein said schedule storing means classifies said allowable largest value dependent on said engine rotation speed according to ranges of vehicle speed.

12. A suspension control device according to claim 1, wherein said information units comprise a target of the damping coefficient of said damper to be targeted according to braking applied to the vehicle.

13. A suspension control device according to claim 12, wherein said schedule storing means classifies said target value dependent on braking according to ranges of vehicle speed.

14. A suspension control device according to claim 12, wherein said information units comprise an allowable largest value of an abrupt change of braking.

15. A suspension control device according to claim 14, wherein said schedule storing means classifies said allowable largest value dependent on an abrupt change of braking according to ranges of vehicle speed.

16. A suspension control device according to claim 1, wherein said information units comprise value of the damping coefficient of said suspension to be targeted according to an allowable largest axial force acting through said damper.

17. A suspension control device according to claim 1, wherein said information units comprise value of the damping coefficient of said suspension to be targeted according to an allowable largest changing rate of axial force acting through said damper.

18. A suspension control device according to claim 1, wherein said new schedule generating means, said schedule evaluating means, said highest ranked schedule adopting means, and said lowest ranked schedule deleting means are operated intermittently throughout an operation period of said suspension so as to occupy a substantially small portion of said operation period.

* * * * *